United States Patent [19]
Gat

[11] Patent Number: 5,166,755
[45] Date of Patent: Nov. 24, 1992

[54] SPECTROMETER APPARATUS

[76] Inventor: Nahum Gat, 1227 9th St., Manhattan Beach, Calif. 90266

[21] Appl. No.: 528,070

[22] Filed: May 23, 1990

[51] Int. Cl.$^5$ .......................................... G01N 21/25
[52] U.S. Cl. .................................... 356/419; 250/226
[58] Field of Search .............................. 356/416–419, 356/420, 326; 250/226

[56] References Cited

U.S. PATENT DOCUMENTS

| | | | |
|---|---|---|---|
| 3,442,572 | 5/1969 | Illsley et al. | 350/166 |
| 3,728,029 | 4/1973 | Hirschfeld | 356/326 |
| 3,737,239 | 6/1973 | Adams et al. | 356/177 |
| 3,794,425 | 2/1974 | Smith et al. | 356/51 |
| 3,811,781 | 5/1974 | Lowy | 356/188 |
| 3,877,812 | 4/1975 | Thompson | 356/97 |
| 3,929,398 | 12/1975 | Bates | 356/186 |
| 3,938,896 | 2/1976 | Selgin | 356/416 |
| 3,963,351 | 6/1976 | Chance et al. | 356/85 |
| 3,973,118 | 8/1976 | La Montagne | 356/416 |
| 4,081,277 | 3/1978 | Brault et al. | 96/38.2 |
| 4,082,464 | 4/1978 | Johnson | 356/188 |
| 4,134,683 | 1/1979 | Goetz et al. | 356/407 |
| 4,291,985 | 9/1981 | Tsujimura | 356/408 |
| 4,477,190 | 10/1984 | Liston et al. | 356/418 |
| 4,560,275 | 12/1985 | Goetz | 356/326 |
| 4,650,321 | 3/1987 | Thompson | 356/73 |
| 4,657,398 | 4/1987 | Brunsting | 356/418 |
| 4,663,656 | 5/1987 | Elabd et al. | 358/75 |
| 4,712,010 | 12/1987 | Alm | 250/334 |
| 4,716,456 | 12/1987 | Hosaka | 358/75 |
| 4,719,350 | 1/1988 | Alm | 250/330 |
| 4,743,112 | 5/1988 | Burke | 356/326 |
| 4,764,670 | 8/1988 | Pace et al. | 250/226 |
| 4,773,756 | 9/1988 | Blechinger | 356/334 |
| 4,775,853 | 6/1988 | Perez Borruate | 340/521 |
| 4,775,885 | 10/1988 | Sato et al. | 358/44 |

FOREIGN PATENT DOCUMENTS

| | | | |
|---|---|---|---|
| 0136075 | 6/1979 | German Democratic Rep. | 356/419 |
| 0180310 | 10/1984 | Japan | 356/419 |
| WO89/05465 | 6/1989 | PCT Int'l Appl. | |

OTHER PUBLICATIONS

Lerner et al., "The Optics of Spectroscopy", J-Y Optical Systems, Chapter 2, 1988, pp. 10–27.
Denton et al., "Charged-Injection and Charge-Coupled Devices in Practical Chemical Analysis", 1983, American Chemical Society.
"Data Translation Arithmetic Frame Grabber", DT2861 Data Sheet, Data Translation Corp., Catalog, 1990.
Sims et al., "Multielement Emission Spectrometry Using a Charge-Injection Device Detector", 1983, American Chemical Society.
Wedge Filter Spectrometer, International Patent Application by Pellicori Application #PCT/US88/03898, (publication #WO89/05465), Feb. 11, 1988.
Circular Variable Filters, V. L. Yen, Optical Spectra Magazine, 1982.
Have You Considered Using Variable Band-Pass Filters?, Laser Focus World, Sep. 1989.
Data Translation Arithmetic Frame Grabber DT 2861 Data Sheet, Data Translation Corp. Catalog, 1990.
Self Scanning Photodiode Array: A Multi-Channel Spectrometric Detector, Y. Talmi, Applied Optics, vol. 19, No. 9, 1980.
The Quiet Revolution in Spectrographs: OE Reports, May 1990, p. 10.

Primary Examiner—F. L. Evans
Assistant Examiner—K. P. Hantis
Attorney, Agent, or Firm—Ronald M. Goldman

[57] ABSTRACT

A spectrometer apparatus uses a spectrum resolving sensor containing an opto-electronic monolithic array of photosensitive elements, each preferably sub-millimeter in size and pitch, and a continuous variable optical filter, that is permanently aligned with the array. Polychromatic light passing through the variable filter is spectrally resolved in accordance with the local filter transmission function, and is incident upon the photosensitive elements in the array. The electrical output of each element in the array is thence a function of the local transmission function of the variable filter and the output of all the elements provides the spectral contents of the polychromatic light. High spectral resolving power is obtained by subtraction of the output signal of adjacent elements in the array.

23 Claims, 6 Drawing Sheets

Fig_1a

Fig_1c

Fig_1b

Fig_2a

Fig_2b

Fig_3

Fig_4

Fig_5

Fig_6

Fig_7

Fig_10

Fig_15

Fig_16

Fig_17

Fig_19

Fig_18

Fig-15b

SPECTROMETER APPARATUS

FIELD OF THE INVENTION

This invention relates to opto-electronic spectral measurement devices and, more particularly, relates to a spectrometer apparatus for imaging and for electromagnetic radiation analysis application.

BACKGROUND

Spectrometer apparatus are known and used for measuring and analyzing the spectral, or "color", contents of electromagnetic energy in the frequency range or spectrum of optical wavelengths, defined herein as being from ultra violet, visible, through infra red, that portion of the electromagnetic radiation which produces photo-electric effects, collectively referred to herein as "light." Those kinds of opto-electronic apparatus are used for both imaging application, as by inspecting the spectral reflectance characteristics of a two-dimensional object, and for non-imaging applications, as by analyzing the spectral emissions of thermal radiation by a material subjected to intense heat. The apparatus are also referred to by many different names depending upon the application to which they are put in part and upon the attached accessories, such as spectrograph, spectroscope, spectroreflectometer, spectrophotometer, spectrofluorometer, spectrobolometer and the like, including those others identified hereinafter. For present purposes such apparatus are collectively referred to as "spectrometer apparatus". Such spectrometer apparatus are considered in some detail next, beginning with non-imaging techniques.

Spectrometric measurements of optical radiation are performed basically in two ways; using a dispersing (refracting or a diffracting) element, and by using a filter-based device. Typical resolving powers from 1,000 to 50,000, and 5,000 to 500,000 are obtained using a prism or diffraction grating, respectively. Resolving power of a hundred to several thousands are obtained with a filter. A third method, using an interferometer, with resolving powers from 10,000 to 5,000,000 is reserved for a very high spectral resolving power applications, and is of no interest as background to the present invention.

In the dispersion based approach to spectral measurement, a radiation dispersion device is used to separate the incident polychromatic light into its spectral contents. The spectrally separated light is then projected onto a photodetector to measure the relative intensity in each spectral range. The dispersion device may be a prism or diffraction grating; in either case the spectrally separated light moves in a diverging or spreading beam. After traveling inside an enclosure over a sufficient distance the spectral bands are adequately separated, spatially. The bands of light are then directed, with reflective optics, at the detection device. A single photodetector, such as a solid state detector or a photomultiplier tube, depending on the spectral region and the intensity, may be used to measure the intensity of one narrow spectral band of the incident light. The dispersion system is then rotated slightly by a mechanical device to a new position in order to direct other narrow bands of the light onto the photodetector and the next intensity measurement is taken. In this sequential manner it is possible to scan and measure the complete spectrum of the light bands that the spectrometer is capable of dispersing.

Such an instrument, often referred to as a monochromator, is commercially available, but is large in weight and size. It requires a physically large enclosure for the diverging light to achieve adequate spatial separation of the light spectra. In addition the instrument is delicate, inappropriate for use in harsh environments, and easily falls out of alignment. That instrument, moreover, cannot provide simultaneous measurement of all the spectral contents in the received light.

To overcome the latter limitation, a polychromater is commonly used. In this apparatus the dispersed light may be directed onto a linear array of photodetectors. The array is positioned such that each individual photodetector in the array measures a different band of the dispersed light being received. For similar reasons to those mentioned earlier in regards to the monochromater, such a polychromater is still large in weight and size, and is too delicate for a harsh field environment. Furthermore, none of these instruments has a selectable spectral resolution or band-width. In order to change the instrument's resolution, the dispersion element has to be changed.

For those less skilled in the art, details of the construction of non-imaging spectrometers, spectrographs, spectroradiometers and spectroscopes are presented by Philip N. Slater, in "Remote Sensing; Optics And Optical Systems", published by Addison-Wesley Publishing Company, 1980, Chapter 7; and by H. S. Chen in "Space Remote Sensing Systems", published by Academic Press, 1985, Chapter 5, to which the interested reader may make reference.

A purpose of the present invention, which employs a photodetector array, is to overcome the difficulties associated with the size, weight, and limitation on spectral accuracy in detection due to mechanical motion, the band-width selection, and the delicate structure of the previously described dispersion-based instruments.

The second approach for measuring the spectral contents of the light utilizes optical filters and photodetectors. A single band-pass filter may be placed over a detector to measure a single spectral band of the incident light. In the "poor man's" spectrometer, a multiplicity of band-pass filters, each of which is used in conjunction with one of a multiplicity of detectors, is used to form a multi-channel instrument. Such a device may be used to simultaneously measure several spectral bands of light, such as in the devices presented in U.S. Pat. Nos. 3,973,118 and 3,737,239. Two or three-channel versions of this concept are commonly used in the so-called 2-or 3-color pyrometers for non-contact temperature measurements.

Of the preceding two patents, the method used by LaMontagne in U.S. Pat. No. 3,973,118 measures simultaneous and discrete spectral bands by the use of several detector and spectral band-pass filter combinations, packaged in a single housing. Although in theory, such approach may be expanded to a very large number of detectors, the discrete photodetectors in LaMontagne's device cannot be positioned in the housing with the spatial precision required for imaging applications or for very accurate spectroscopic measurements, those requiring resolution on the order of but a few Angstroms in wavelength. Further, since no known set of discrete optical filters of the type presented in LaMontagne are available, in which each narrow band-pass filter is slightly spectrally shifted as compared to the adjacent filter, the technique is limited for use in low resolution spectral measurements and to non-contiguous bands only.

In imaging applications, the spatial and the spectral resolution require the use of very small individual detectors, which are positioned very close to each other in great accuracy. Therefore, for similar reasons it would not appear possible to make an acceptable imaging array with LaMontagne's method; a large scale integration, LSI, technology must be applied for adequate imaging performance. Yet another severe limitation of this method is that the band-pass of each detector is determined by and cannot be better than the band-pass of the filter. Moreover, on a more practical note, since each photodetector in the LaMontagne device is connected to an associated external connector pin, a spectrometer device with a very large number of pins, for example, in the thousands or millions, as would be required for high resolution, requires an electrical connector that is completely impractical. Further, since all photodetectors are connected to a common lead, the capacitance of the system with many detectors would be too large to be practical.

The present invention also employs an optical filter. However, as becomes apparent, the limitations characteristic of LaMontangne's device are eliminated in the present invention.

Other variations on the described filter-based technique are common. A filter-wheel, on which several filters are mounted, is used in conjunction with a single photodetector or several photodetectors. The wheel is mechanically rotated to position one filter at a time above the photodetector to provide non-simultaneous, sequential, spectral measurements. Examples of prior knowledge of this form of spectrometer apparatus are presented in U.S. Pat. Nos. 4,477,190; 4,291,985; 4,082,464; 3,963,351; and 3,877,812. In yet another variation, the discrete filters in the disk are replaced with a continuous circular variable filter, "CVF", which is placed over a detector. Continuous or circular variable filters are addressed in the literature: "Circular variable. Filters", Yen, Optical Spectra Magazine, 1982; "Have You Considered Using Variable Band Pass Filters", Laser Focus World, September 1989; Circular Variable Filter, Illsley et. al., U.S. Pat. No. 3,442,572. The CVF may be rotated to allow the measurement of a continuous, but not simultaneous, spectrum of light. Alternatively the CVF may be placed over several detectors to provide simultaneous spectra in a limited number of bands, as presented, for example, in U.S. Pat. Nos. 4,657,398; 3,929,398; 3,811,781; and 3,794,425. Finally, a limited number of spectral bands may be obtained by a combination of beam splitters and dichroic filters. This technique is also limited, for practical reasons, to a few bands only. The present invention as is shown hereafter has the spectral measurement capability of hundreds of contiguous bands of light.

Imaging type spectrometers are next considered as additional background. An imaging device which uses a charge coupled device, CCD array, is described by Goetz and Landauer in U.S. Pat. No. 4,134,683. In the Goetz and Landauer invention, four such CCD arrays are used, each in conjunction with a corresponding band-pass filter, to give four overlapping spectral images of the same scene in a method similar to that used in some broadcast television cameras. The difficulty with that approach to spectral imaging, stems from the need to precisely align all four detector arrays with the scenery being viewed. Even if the alignment is correctly accomplished, however, only a four color resolution is obtained. An extension of this technique to additional colors appears impractical because of the alignment difficulties of multiple arrays and the impracticality of simultaneously handling the great amount of data output of dozens or more such arrays to obtain a better spectral resolution. An aspect to the present invention includes the adaption of CCD devices within a versatile high resolution imaging spectrometer, one that is not limited to four color resolution.

Inventions presented in U.S. Pat. No. 4,764,670 and U.S. Pat. No. 4,081,277 each teach how to make solid state imaging devices by depositing a filter array over a multi-sensor device. Both techniques discuss the use of the three primary color filters, red, green and blue. Although presently marketed color video technology utilizes such an approach, it is also limited in the spectral resolution, primarily due to the broadband filters used. It is deficient in the spatial resolution, since it takes at least three photosensitive elements to cover a single point, each at one of the primary colors. Details of imaging systems are given by P. N. Slater and H. S. Chen in the reference cited previously. Embodiments of the present invention provide an essentially "infinite" spectral resolution at no loss of spatial resolution.

Space borne applications for spectrometer apparatus in both imaging and non-imaging application have been extensive. For example, a 12-channel prism, and a 9-channel grating spectrometers were constructed for space-borne sensing of terrestrial resources. A 13-band multispectral scanner, flown on the Skylab, measured spectral bands from 20 to 100 nm wide in the range between 410 nm and 2350 nm.

The LANDSAT-D satellite used two scanning-type instruments, the Thematic Mapper, TM, and the Multi-Spectral Scanner, MSS. The latter sensor used four channels: a 500 to 600 nm, green; 600 to 700 nm, yellow; 700 to 800 nm, red and near infrared; and 800 to 1100 nm, near IR. The Coastal Zone Color Scanner, CZCS, flown on the Nimbus satellite used a grating spectrometer and five visible-near IR channels with a spectral band of about 20 nm in the visible, centered at 443 nm, blue; 520 nm, green; 550 nm, yellow; and 670 nm, red; a 100 nm band in the near IR centered at 750 nm, and a 2 micrometer band in the far IR centered at 11.5 micrometer. A dichroic beam splitter was used to separate the far IR radiation band from the visible radiation band. In a scanning system, a moving mirror is used to scan different parts of the scene across the array of detectors in order to get multispectral images, each detector operates at a different wave-band.

A 14-channel radiometer, using detector/filter combinations was used on the Earth Radiation Budget, ERB, sensor flown on the Nimbus 7 satellite. The Solar Backscatter Ultraviolet, SBUV, used a moving grating spectrometer to monitor 12 selected narrow wavelength bands, and a filter photometer to measure a fixed band. The Total Ozone Mapping Spectrometer, TOMS, measured six discrete wavelength with 1 nm band. Both instruments have also flown on the Nimbus satellite.

The French SPOT satellite employs two High Resolution Visible, HRV, imaging sensors. The multispectral sensor uses CCD arrays with filter based spectral bands centered at 550 nm, green; 650 nm, red; and 840 nm, near IR, all with about 80 nm band-pass. The panchromatic CCD has a band-pass from 500 to 900 nm. NASA's multispectral Linear Array, MLA, uses four fixed band CCD channels with band-pass from 460 to 470 nm, 560 to 580 nm, 660 to 680 nm, 870 to 890 nm, and two near IR CCDs with fixed bands from 1230 to 1250 nm, and 1540 to 1560 nm.

The Airborne Visible Infrared Imaging Spectrometer, AVIRIS, placed in service by NASA in 1987, is one of the most advanced imaging spectrometers uses 244 bands with about 9.6 nm bandwidth. Finally, the new generation imaging spectrometers scheduled to be constructed and flown by NASA on-board the Space Station in the late 1990s are the High Resolution Imaging Spectrometer, HIRIS, and the Moderate-Resolution Imaging Spectrometer, MODIS. Both instruments use area arrays to obtain spectrally resolved images of a one-dimensional scene. The spectral resolution, though, is achieved with a diffraction grating with a 10 nm band-width. Further particulars of various space-borne instruments are described in a Report to the Congress titled Space-Based Remote Sensing of the Earth, prepared by NOAA and NASA in 1987; in the Nimbus 7 Users' Guide, published by NASA August 1978; in Remote Sensing of the Environment, by J. Lintz and D. S. Simonett, published by Addison-Wesley, 1976; in the Earth Observing System—Instrument Panel Report, volumes IIb, MODIS, and IIc, HIRIS, published by NASA in 1987, and in the two references cited earlier.

The foregoing imaging devices are limited to a few spectral bands, often provide non-simultaneous spectra, and, depending on the application, require a scanning system, which is less reliable and less accurate than a system with non-moving parts. The spectral resolution of these devices is low and is fixed by the hardware design and cannot be changed in operation, thus limiting versatility. As it is shown herein the present invention is believed to alleviate the aforementioned deficiencies, through elimination of all moving parts, and increase the operational capabilities of the measuring methods discussed above through software control of the spectral resolution.

An object of the present invention, therefore, is to provide an improved spectrometer apparatus for use in any of the applications described in the foregoing section that is small, lightweight, rugged and permanently aligned, inexpensive, solid state device of versatile application, suitable for manufacture at least in part using LSI technology so that the size and weight can be at least one thousand times smaller than such conventional spectrometer apparatus.

An additional object is to provide spectrometer apparatus having enhanced spectral and spatial resolution than previously existing filter types without use of dispersion devices and which avoids the need for alignment adjustments in use.

A further object of the invention is to provide a simplified method for measuring simultaneously the contiguous spectra of a polychromatic optical radiation by use of a solid-state array and filter combination without the use of moving parts with the arrays being line type or area type in alternative embodiments. Such spectral measurements may be provided in a narrow-band pass mode, a wide-band pass, a long-wave pass, or a short-wave pass modes and for various portions of the optical spectrum; the ultra-violet, the visible, or the infra-red.

A still further object of the invention is to provide spectrometer apparatus that has a selectable spectral resolution from very fine, several Angstroms, to coarse, several nanometers, by means of an associated signal processing technique.

And, it is an additional object of the invention to provide like benefits in spectrometer apparatus, regardless of whether used for non-imaging applications or in imaging applications.

SUMMARY OF THE INVENTION

Spectrally resolved measurements of polychromatic light are achieved with an array of photosensitive elements, such as photodetectors or "pixels", and a continuous linear variable filter, LVF, mounted in a single housing. The variable filter may be formed in alternative embodiments by optical coatings deposited directly onto the photodetector array. Fine resolution is achieved with any of an edge-type, such as a long-wave pass, a short-wave pass, or a band-pass LVF in the described combination. In accordance with the foregoing objects, an improved spectrometer apparatus according to the invention contains a continuous linear variable wavelength filter fixed in overlying relationship with a photodetector array with the photosensitive sites in the array, referred to as pixels, being formed on a single monolithic substrate, as a one piece assembly. The filter extends along the length of the array, parallel to the array's axis, so that each pixel is located behind a different portion of the filter, whereby each pixel is exposed to a different spectral band of the polychromatic light incident upon the filter corresponding to the spatial position of that pixel along the length of the filter. Each pixel, therefore, responds to a different spectral content of an incident beam of polychromatic light.

With the monolithic substrate the photosensitive sites, elements, or pixels, as variously termed, may be formed in a small size and be packed close together with accurate spacing therebetween. Suitably, a housing serves to support at least the filter and the array in a unitary sensor assembly. Electronic means interrogate or, as variously termed, scan or poll, the individual pixels in the array and thereafter process and/or store the information thereby obtained for contemporaneous or future readout or display. In a specific embodiment, some of the electronic means referred to is formed upon the same substrate as the photosensitive array, allowing for a spectrometer on a chip, so to speak, that may be connected to an external display. In addition to an external display, such as a video monitor or a conventional cathode ray tube device, in other embodiments, the display may be of liquid crystal type, LCD, and may be carried by the same housing as the sensor portion.

Suitably the electronic means includes conventional processing means for receiving outputs, often referred to as "video" signal, representing individual pixels in the array as by scanning or polling and the like. In still additional embodiments the processing means may include self scanning circuitry associated with the array to provide appropriate input to circuits or buffers in other parts of the processing means. The electronic means may include a microprocessor for further data processing, for controlling the array scanning rate and frequency and for general interfacing with other apparatus.

In accordance with a more specific aspect of the invention, the arrays used in the invention are either of the parallel output type or of the various charge storage or transfer, photon integration, type, which are customarily referred to as Charge Coupled Device, CCD, Charge Injection Device, CID, Charge Coupled Photo-Diode Array, CCPD, Self-Scanned Photo Diode Array, SSPD, or several other like types. These devices include a monolithic or hybrid integrated circuit which contain the electronics for sequentially scanning and reading the signal of each pixel in the array, and are manufactured utilizing LSI technology.

In a still additional aspect to the invention, the linear variable filter within the spectrometer is an edge type of the short-wave pass type or of the long-wave pass type or, alternatively, is of the band-pass type; and the electronic means includes means, such as an algorithm means, to subtract the output of one pixel in the array from that of a preceding pixel to derive information as to spectral intensity in the band defined by the two pixels physical displacement along the filter. As shown hereinafter, with a typical pixel dimensions of several micrometers, as an example, a resolution of a few Angstrom is obtained by such subtraction. The necessity of a band-pass type filter of such a fine resolution, even if possible of construction, is avoided.

The spectrometer apparatus thus utilizes an array of photodetectors in conjunction with a linear variable optical filter as a sensor, and is capable of resolving and/or measuring simultaneously a contiguous spectrum of polychromatic light incident upon the sensor. The improved spectrometer apparatus can be utilized for non-imaging as well as imaging applications and in scanning or non-scanning systems.

With the invention substantial simplification of the instrumentation previously required for spectral measurements of polychromatic light is obtained since the dispersion element (refracting or diffracting) is not needed and the long path for spatial separation is avoided. Not only is the weight and size of a spectrometer reduced by the miniaturization provided by this invention, but so is its cost. Size and weight are often very important considerations, in particular with portable or space-borne instruments. Cost is reduced because all the mechanical elements of a spectrometer are eliminated and the number of components in the assembly of the present invention is minimal. The invention, therefore, opens the door for applications in industry and science which were not practical in the past due to the equipment limitations.

The disclosed invention permits construction of a ruggedized spectrometer instrument which is fabricated with permanent alignment between the variable filter and the photosensitive elements and can operate under a harsh field environment. With the invention a continuous spectra over a wide band of light may be measured, by using arrays containing anywhere from a few, to several thousands or millions of pixels. The spectral resolution may also be adjusted by the proper selection of the array and the filter's spectral spread. This is believed to be a major improvement over the use of discrete filters which can measure only a few discrete bands of radiation.

With proper care, such as by cooling the array, the apparatus operates at a very low signal-to-noise ratios, allowing the detection of very low intensity radiation, a decided advantage. Further, the signal integration time may be electronically controlled for either very short durations, milliseconds, when the incident light is high, or very long durations, on the order of minutes or even hours when the light is faint. Another advantage of the invention is the very wide dynamic range made possible by an array-based spectroscopic instrument. The spectrometer is also immune to "light shock", i.e., it rapidly recovers from over-exposure.

In still additional embodiments of the invention operation at extremely low light levels is possible. For such applications, the linear variable filter component is mounted over a conventional image intensifier, such as a second or third generation microchannel plate type intensifier, which in turn is mounted over the photo sensor array. The image intensifier, as is conventional, contains a photocathode and a phosphor screen on its input and output sides, respectively, amplifies light incident on the input, some 10,000 to 20,000 times, and provides the amplified light as a brighter image appearing on the output screen, the latter of which supplies the light output to the photodetectors.

High spectral resolution, not possible with the conventional three primary colors, red, green, and blue, or similar schemes, is achieved by the invention. The signal processing technique, implemented in the associated electronic circuits, allows this high resolution, as little as several Angstroms in wavelength, to be obtained by use of either a long-wave pass or a short-wave pass variable filters. It does not require a band-pass filter.

The high degree of geometrical accuracy of the array improves the spectral and spatial accuracy compared to that of mechanical scanning devices. Further, the fine spatial separation of the pixels, a few micrometers, provides the fine spectral resolution obtained by this technique. The spectrum resolving sensor, may even be fabricated on a curved surface to meet the needs of a large focal plane array, FPA.

The spectral resolution and the band-pass may be selected by the user by means of the associated signal processing and data handling elements, a further advantage. Signal processing can also be used for calibration, pixel spectral response correction, pixel uniformity corrections, background signal suppression, dark current suppression, time delay integration, and various other signal enhancement techniques. Random access capability is available; it allows one to sample any pixel of interest while eliminating the need to process a large amount of unwanted data, permitting enhanced versatility.

Although the measurement of the spectrum of electromagnetic radiation has been practiced for years, none of the practiced techniques suggest or imply the use of the detector's geometry in conjunction with a variable filter to effect the band-width of the measured readiation. In view of the complexity of the prior art spectrometric systems, the simplicity of the invention is believed to provide new, unexpected and superior results. The invention permits the elimination of the prism or the diffraction grating in lieu of the single solid state device reducing the size and weight of prior art spectrometer apparatus by more than a 1,000 times. Further, the use of a long-wave or short-wave pass variable filter in conjunction with the detector array and the described processing procedure, to obtain a fine band-pass resolution, provides a result not heretofore taught or suggested.

The foregoing and additional objects and advantages of the invention together with the structure characteristic thereof, which was summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE DRAWINGS

In the drawings:

FIG. 13a is an illustration the use of the spectrometer in a space borne imaging application and FIG. 13b is an enlarged view of a portion of FIG. 13a;

DETAILED DESCRIPTION

Figure 1A:
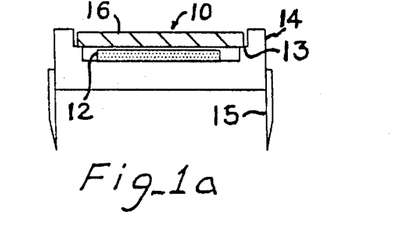
FIGS. 1A, 1B and 1C presents the spectrum resolving sensor portion of the spectrometer apparatus in side section view, top view, and right side view, respectively.
Figure 1B:
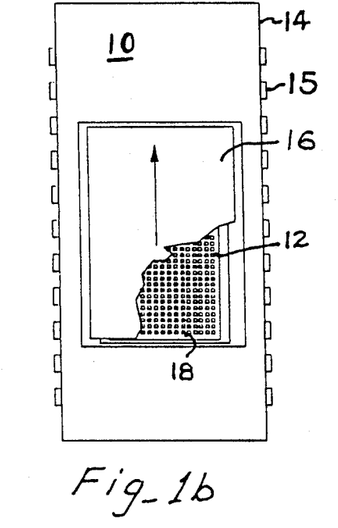
Figure 1C:
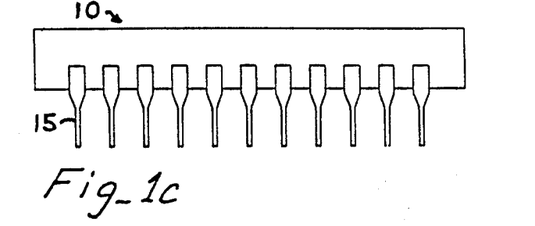

Referring to FIGS. 1a, 1b and 1c, a spectrum resolving sensor assembly 10 is illustrated in side section view, top plan view and right side view, respectively. The assembly includes a monolithic area array, 12, such as, for example, an NEC PD 35400 device, containing 728×493 photosensitive sites, pixels, 12.3 micrometers×13.5 micrometers each in dimension, which is housed in a typical electronic package, 14; and a linear variable filter, "LVF", 16, mounted overlying and covering the photosensors. The linear variable filter is illustrated partially cut-away to reveal the underlying pixels 18. The LVF is positioned such that the spectral transmission varies along an axis indicated by the arrow. The spectral transmission characteristic does not change in the lateral direction and depends only on the axial position. In this embodiment, the package contains ledges 13, on either side of the channel in which the photosensor array is positioned, to which the linear variable filter is cemented in a position slightly elevated, spaced from the photosensors. In another embodiment, described elsewhere herein, the filter is coated directly over the sensor 12.

When spectrum resolving sensor 10 is illuminated with a polychromatic light, each lateral row of pixels, 18, is exposed to a different spectral band of this light due to the continuously variable transmission characteristic of the filter. The flow of electronic commands into, and data from the sensor is accomplished via the contact pins, 15, in the conventional manner as is later discussed in greater detail.

To complete the spectrometer apparatus, the sensor assembly is installed on a printed circuit board containing the appropriate electrical connector sockets to contact and seat the pins 15, which is conventional. The printed circuit board may also support the appropriate electronics later herein described, which is also of conventional circuitry.

An alternative form of sensor contains a line of photosensitive sites to form a line array, in contrast to the two dimensional area array earlier described. This alternative form is presented in FIG. 2A in top view in which for convenience like sensor elements are denominated by the same numbers as in the prior figures and in which corresponding elements are given the same number as the counterpart in the prior figures, but primed. As illustrated, the large number of photosensitive elements or sites, 17, are presented not to scale, form a straight line or axis. Those photosensitive sites are covered by linear variable optical filter 16, the latter of which is partially cut away in the figure. By way of example the array may be of the type marketed by the EG&G Company in the EG&G SB series devices. The side and section view of this alternative are the same in all essential respects as that of FIGS. 1A and 1C and thus do not require separate illustration.

Figure 2A:
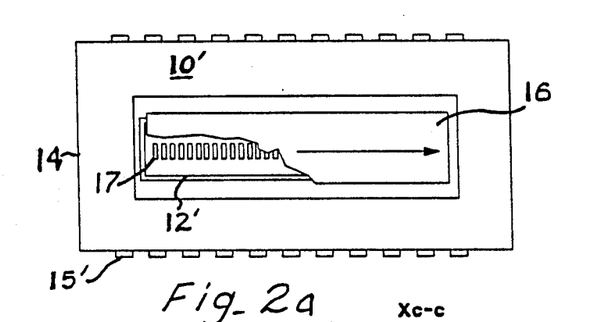
FIG. 2A shows a top view of an alternative form of sensor and FIG. 2B illustrates to an enlarged scale the line of photosensitive elements incorporated within the sensor portion of FIG. 2B.
Figure 2B:
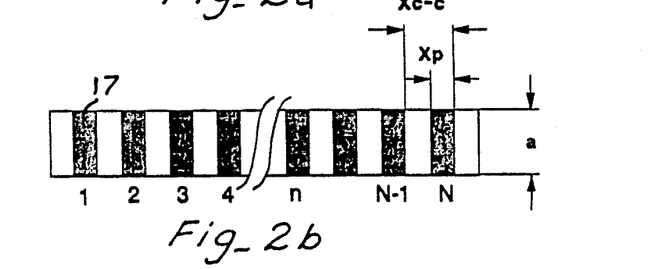

As shown to an enlarged scale in FIG. 2B the spacing between the one edge of the pixel, or photosensitive element, to the corresponding position of the next, $X_{c-c}$, is about 25 micrometers the width of the element, $x_p$, is 15 micrometers, the heighth, a, may be from 25 to 2500 micrometers. These dimensions are typical of line CCD arrays. While the number of pixels in the array may be as small as 64, 128, or 256, it is preferably greater than 512 or 1024. In an area array, as was graphically depicted in FIG. 1, the element may be square or rectangular, with a few micrometers spacing or no spacing at all, such as in the "Kodak Megaplus" camera, marketed by The Kodak Company, which contains a 1340×1037 square pixels, 6.8 μm on a side, with zero spacing between.

The mode of operation of the form of spectrometer apparatus containing the sensor of FIG. 2A is the same as that described for FIG. 1, the electronics being less complex as there are fewer pixels to poll. The sensor of FIG. 2A is also mounted on a printed circuit board containing the appropriate electrical connections for pins 15' and that printed circuit board may also contain the conventional electronic elements to poll the pixels and process the spectral information derived from each pixel.

Figures 3, 4:
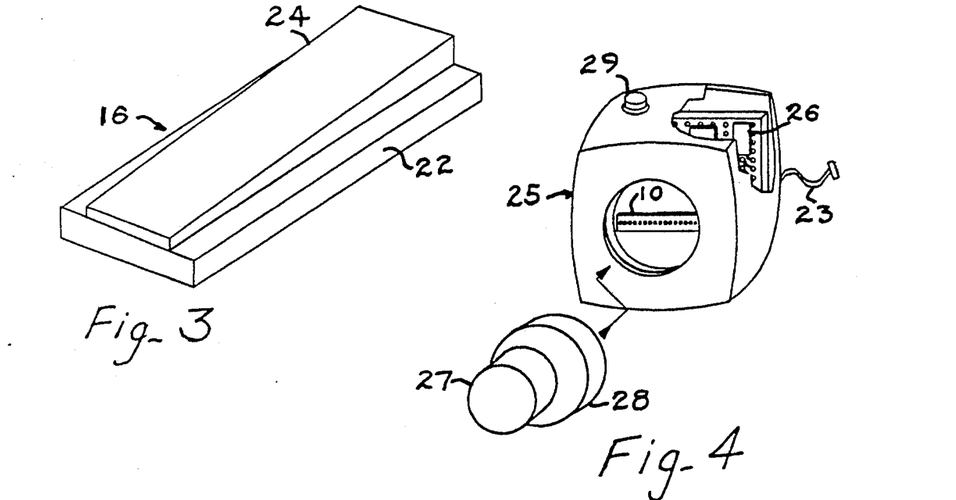
FIG. 3 is an illustration to an enlarged scale of a perspective view of a continuous linear variable filter used in the sensor portion of FIG. 1.
FIG. 4 is an illustration in a partially exploded view of a preferred embodiment in the form of a portable hand held spectrometer apparatus.

A linear variable filter 16 is shown to an enlarged scale pictorially in FIG. 3. The filter is made of a base or substrate, 22, of relatively rectangular shape and of a material which is selected on the basis of the desired range of wavelengths in which the variable filter operates. Typical materials for ultraviolet, visible, and near infra-red apparatus are fused silica, vicor, or germanium. The substrate is covered with variable thickness coatings, 24, formed into a wedge shape as illustrated, of a material whose composition also depends on the desired spectral range of operation. Metal-dielectric are typical coating materials. Although the preferred embodiment uses a separate element, the coating material may be deposited directly onto the surface of the array, resulting in a monolithic assembly as discussed elsewhere herein.

Continuously variable wavelength filters in a circular pattern have been available for many years. The method of manufacturing such circular filters is described in U.S. Pat. No. 3,442,572. The same technology has been commonly used to produce a linear variable filter, LVF. Details on the construction and coating processes may be found in "Optical Thin Films; Users Handbook", by J. D. Rancourt, published by McGraw Hill in 1987.

In recent years CCD devices have been replacing the traditional vidicon tube in video cameras. Recent advances have produced such devices with enhanced sensitivity in the ultra-violet, 200 to 400 nm, using Si, and in the infra-red range using PtSi, HgCdTe or other materials. Enhanced UV sensitivity can also be obtained by coating a Si array with various phosphor-based materials, or using a thinned backlighted Si array. All such devices are commercially available, are described in the manufacturers' catalogs, and are well known to those skilled in the art. For instance, the complete theory of operations, circuit diagrams, and application notes can be found in the "Image Sensing Products" catalog by EG&G Reticon, and in the "CCD Sensors, Systems & Developmental Technology" catalog by Fairchild Weston. Most CCD light sensitive devices produce a video-compatible electrical output signal.

A line-array based sensor assembly 10 is shown, symbolically, installed in a hand held camera case, 25 in the partially exploded view of FIG. 4 to which reference is made. A circuit board 26, only partially illustrated, contains the other electronic elements, partially illustrated, and batteries, not illustrated, and is housed in the case. Through the circuit board the pins 15 connect the sensor array in electrical circuit with the other electrical components in the circuit board to permit polling or "read-out" of the photodetector array. The image transfer optics, or a lens system, 27, and a shutter, 28, are attached to the camera in a manner as is done with conventional cameras. The lens system used with the array may be of the anamorphic type, such as a cylindrical lens, in order to transfer a point source of light presented at the front of the lens into a line image to the lens' rear, as described hereafter. A start switch 29 closes the appropriate electrical circuit and allows the operator to take the measurement. Cable 23 connects the unit to a video monitor for display, not illustrated, externally located.

In the embodiment of FIG. 4 exposure control is accomplished in one of several available methods. In a continuous scan mode, the exposure time is equal to the integration time of the array, and no shutter is required at all, although an iris with an automatic gain control may be used—a common technique used in all home video cameras. For a single exposure, a conventional mechanical shutter of the kind within still single lens reflex type cameras is used. An electronic shutter may be used instead of the mechanical one; one such electronic shutter operates by electrically polarizing a Liquid Crystal plate for blocking the passage of light. Other commercially available devices, for instance Varo Electronic Devices of Garland, Texas, and ITT Electro-Optical Products of Roanke, Va., use an electronic gated shutter, a technology well known to those skilled in the art.

Figure 5:
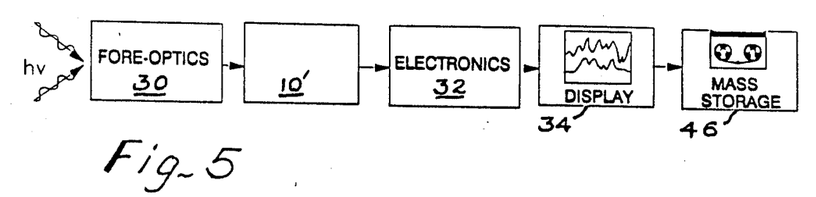
FIG. 5 is an electrical block diagram form of the spectrometer apparatus, incorporating the sensor portion of FIG. 1.

The complete spectroradiometric system is illustrated in block diagram form in FIG. 5. The fore-optics, 30, such as the lens 27 in the preceding figure, "conditions" the incident radiation, focuses the light onto spectrum resolving sensor 10'. The sensor, 10' controlled by the electronics, 32, picks up the signal and passes it for further analysis and display, 34. Mass storage media, 46, may be used to save the data for future use.

The sensor readout electronics includes "on-board electronics" and a sensor interface. The details of the on-board electronics depends on the specific sensor selected. Several examples of sensors and interfaces are discussed. First, a parallel output photodiode array is used in which each pixel is connected to a pin in the electronic package. For instance, the EG&G Photon, PDA series contain 20, 32, 35 or 38 pixels, 4 mm, by 0.94 mm with 1 mm center-to-center spacing, in a package. Each pixel, in this case, must be connected to a standard readout circuit, which is common and well known to those skilled in the art, for a parallel readout. In a second example, the PDA series array can be connected to a multiplexer, such as the EG&G Reticon, M series, parallel-in-serial-out device which allows reading the pixels sequentially. The foregoing is a well known technique. EG&G's published data sheets for that device describe how it may be used in a hybrid or non-hybrid application. In a third example, a Si CCD array is utilized as a monolithic package with the readout electronics. In this case integral parallel and serial registers are used to shift the electrical charge from the array, through an on-board preamplifier to a serial video output signal. The input to the array is typically a clock timer. In a fourth example, a PtSi, InSb, or HgCdTe infrared area array detector is packaged with a CCD multiplexer, such as the EG&G Reticon RA0128M, in a hybrid package. The readout is taken as before with a monolithic Si CCD. The foregoing is also a well known technique.

Further, the CCD data readout may be of various architectures. For instance, a full frame may be transferred from the pixels to a masked set of pixels from which the data is then read out in the conventional manner. An inter-line transfer architecture allows each line of pixels to be transferred to a masked, adjacent line of pixels for subsequent readout. Random access allows reading of only selected zones of pixels out of the complete array. These and other architectures may be used for image control.

Arrays of the types discussed herein are commonly manufactured by several companies, RCA, EG&G, Mitsubishi, Hughes, Kodak, Tektronix, Ford Aerospace and others. These devices are used in common instruments such as home video camera, fax machine, optical character reader, bill exchanger, thermal imaging cameras, and others. The electronic circuitry and readout techniques which is used in this invention and only symbolically illustrated, therefore, is well known to those skilled in the art, and need not be elaborated upon in detail herein. Any conventional electronic circuit and processing apparatus may be used to interrogate the sensor array and process the information thus obtained according to the directions herein given.

As is evident from the various examples discussed above, a principal advantage of using the disclosed invention as compared with the prior art, is in eliminating the need for a large and delicate dispersion system, which requires often re-alignment. In the foregoing paragraphs the components and the assembly of the invention were discussed. In what follows the performance and operations of the invention are further discussed.

Figure 6:
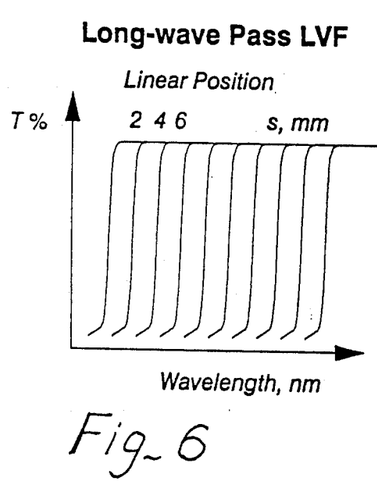
FIG. 6 is a graph of a typical response curve for a long-wave pass linear variable filter.
Figure 7:
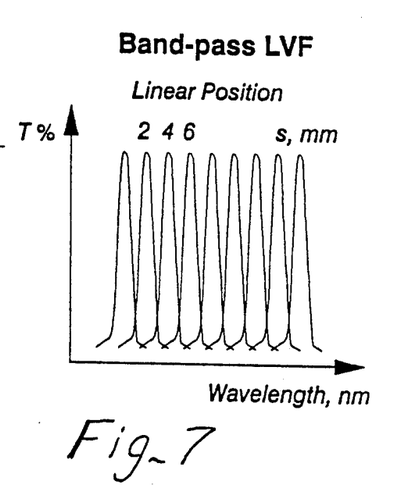
FIG. 7 is a graph of a typical response curve for a band-pass type linear variable filter.
Figure 8:
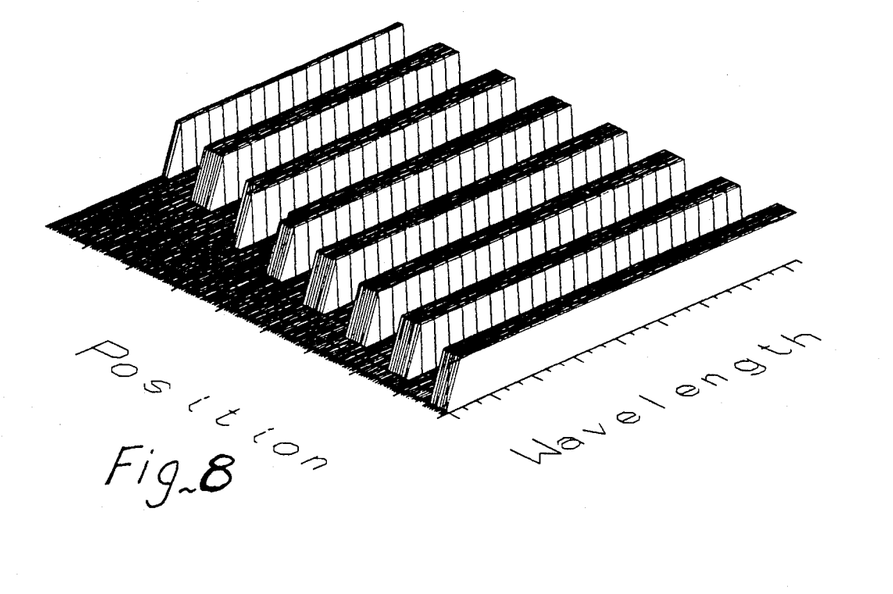
FIG. 8 is a partial graph of an ideal three-dimensional spectral responsivity map of a spectrometer containing a sensor formed of a line photodetector array and a long-wave pass linear variable filter.
Figure 9:
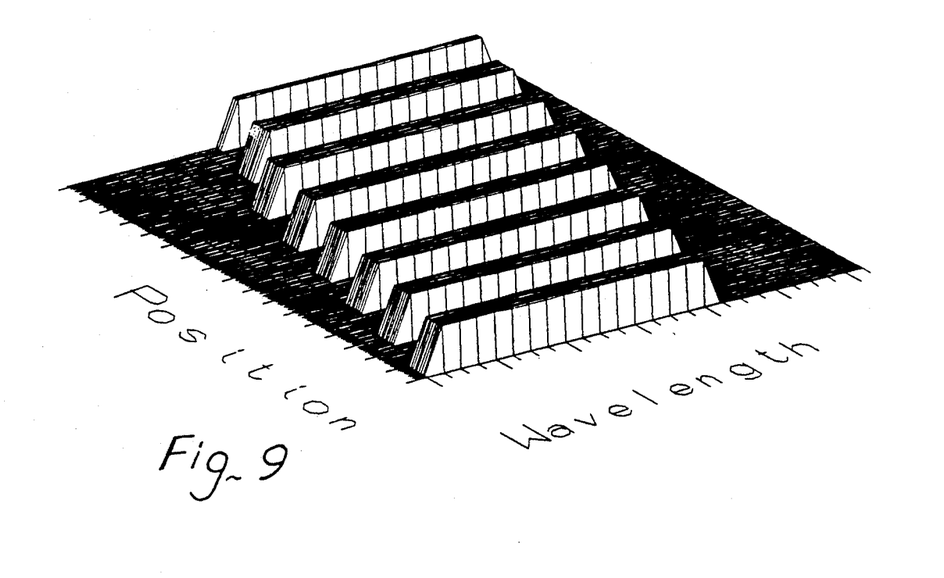
FIG. 9 presents an ideal three-dimensional spectral responsivity map of a spectrometer containing a sensor formed of a line photodetector array and a band-pass type variable filter.
Figure 10:
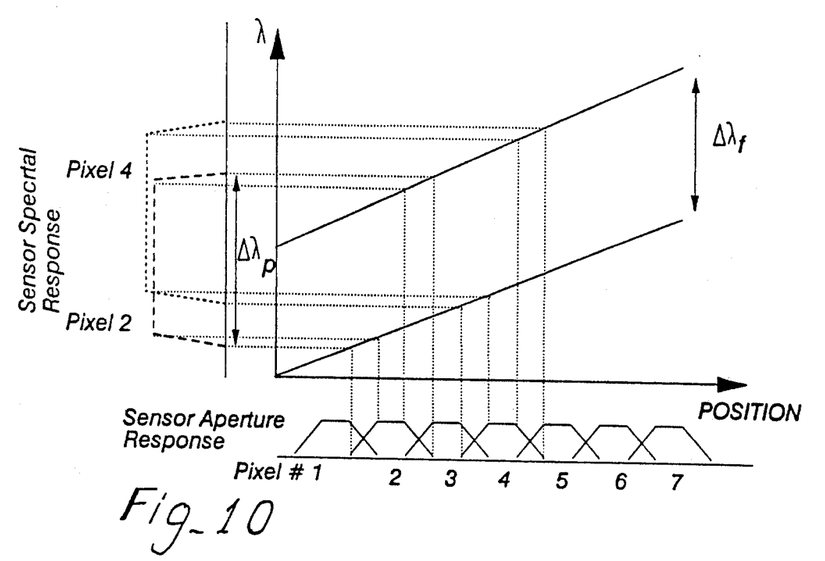
FIG. 10 is a graph of the spectral response of several pixels of a sensor formed of photodetector array and a band-pass type linear variable filter.

When the linear CCD array is combined with a edge type or a band-pass LVF, each pixel is covered by a portion of the LVF with a different spectral transmission. The spectral transmission curves for a typical long-wave pass edge type LVF, and a band-pass LVF are shown in FIGS. 6 and 7. Such characteristics of filters are well known to those skilled in the art. The spectral map of several pixels, showing their location in the array and the corresponding spectral range with the overlying filter in place, are shown in FIGS. 8 and 9. For clarity, only every second pixel is shown in the figures. The band-pass filter has a 5 nm band width, and the pixels in these figures are about 15 micrometers wide with a 25 micrometer center-to-center spacing, similar to those shown in FIG. 2. A two-dimensional representation of the pixels' spectral response with a band-pass LVF is shown in FIG. 10. A typical aperture response of the CCD array of FIG. 2 is shown along the x-axis in the figure. The corresponding spectral response, $\Delta\lambda_p$, of two typical pixels, pixels number 2 and 4, is shown along the y-axis, $\lambda$. The band-pass, $\Delta\lambda_f$, of the LVF relative to the pixels position is also plotted.

Several examples of a spectrometer apparatus utilizing the spectrum resolving sensor in both imaging and non-imaging devices are discussed in the following paragraphs and are illustrated in the additional drawing figures. The optical settings are discussed first, and the electronics, common to all the examples, were discussed previously. The data processing techniques are discussed in greater detail following these examples.

Figure 11A:
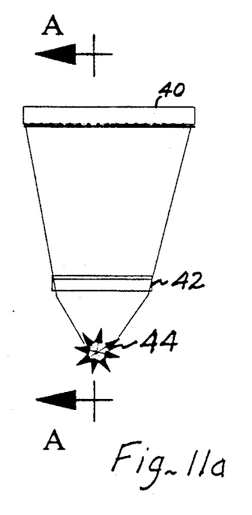
FIGS. 11A and 11B are top and section views of the spectrometer apparatus as part of a non-imaging emission spectrometer.
Figure 11B:
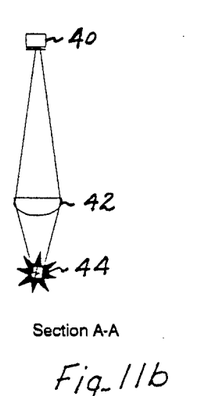

Thus, a non-imaging spectrometer embodiment is presented in FIGS. 11a and 11b in top and side views, respectively. A line array sensor, 40, of the structure earlier described is used to measure the spectrum of a point source, 44, of light radiation. A anamorphic optical system, 42, is used to transfer the image of the source onto the line array. The advantage of anamorphic optics is that it has a different focal length, or magnification level in perpendicular planes to the optical axis, thus acts to focus the radiation in one plane but not in the transverse plane. The radiation source could be a polychromatic light, which has passed through a sample which absorbed certain spectral lines or bands, such as in transmission spectrometer, or may be the radiation emitted from high temperature substance such as in an Induction Coupled Plasma - Atomic Emission Spectroscopy, ICP-AES, instrument.

Figure 12:
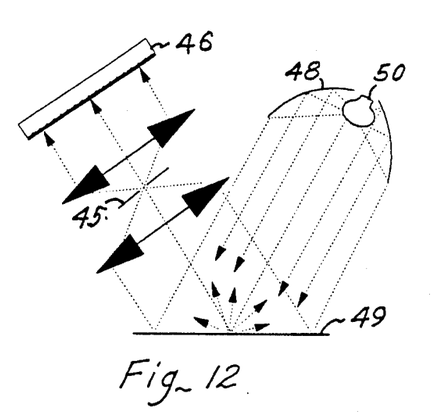
FIG. 12 is a sketch of a second non-imaging application of the spectrometer apparatus in a spectroreflectometer.

In another system pictorially illustrated in FIG. 12 a collimated light beam originating from source 50 is incident upon line array sensor, 46. The collimation in this case is achieved by means of a parabolic reflector, 48, with a source, 50, at the focal point of the reflector. This arrangement would work well with a reflectometer to measure the spectral characteristic of light reflected from a sample, 49, to be studied. A spatial filter system, 45, is used to remove all reflected beams not normal to the sensor's surface.

Figure 13A:
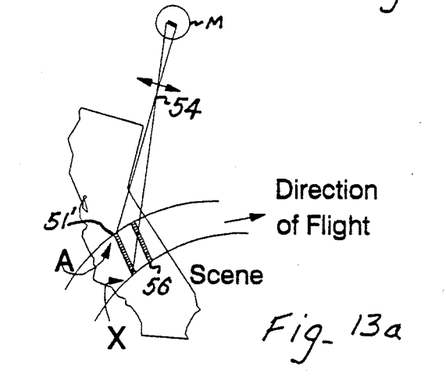
Figure 13B:
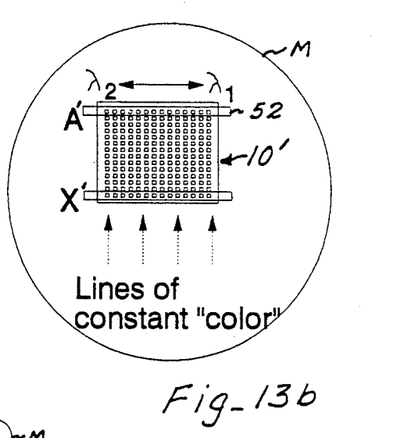
Figure 14:
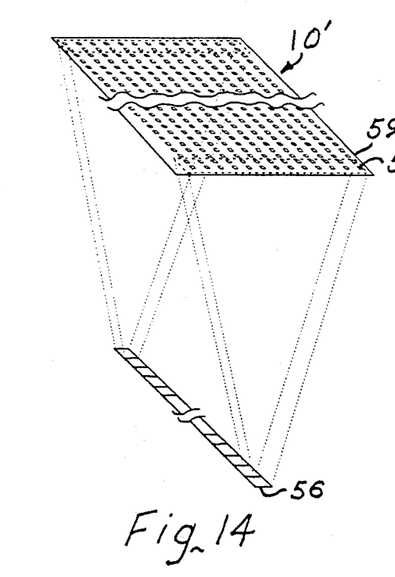
FIG. 14 is an illustration of a portion of the system of FIG. 13 drawn to an enlarged scale and modified to incorporate additional features.

An imaging spectrometer is shown in still another embodiment in the partial symbolic illustration of FIGS. 13a and 13b, which are considered together, with the latter figure illustrating a section of the former figure, M, to an enlarged scale. In this combination an air-borne area array 10' sensor-based imaging spectrometer is used for ground survey. The direction in which the filter's spectral transmission changes is indicated in the figure. A strip of a scene, 51, observed by the imaging optics, 54, is imaged onto the area array 10'. An element, or ground pixel, "A" of the scene strip, 51, located to the left end of the scene strip is imaged across the sensor array, as at A', to provide a spectral map of that one ground element. Other elements of strip 51 are simultaneously imaged, as shown with the ground pixel "X" to the right end of ground strip 51 and its image X' on array 10'. In this way a single strip of the scene is spectrally imaged. As the air-borne platform moves, a new strip of the ground scene, 56, is imaged. The spatial resolution for the system is determined by the pixel size and the imaging optics 54, or the optical telescope, in use. The system does not use a scanner and therefore is commonly referred to as a "pushbroom" type system. In the foregoing embodiment, each ground pixel, A, was imaged across a row of pixels in the array. To improve the signal-to-noise ratio of the spectrometer system, each ground pixel, A, instead may be imaged across two, or more, rows of pixels, 58 and 59, as shown in the expanded partial view of FIG. 14.

Figure 15:
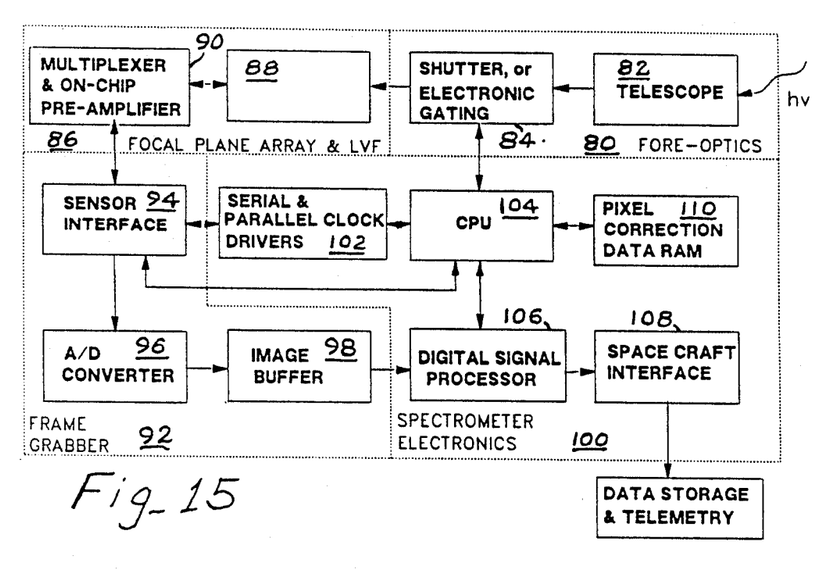
FIG. 15 is a presentation of a space borne imaging spectrometer apparatus in block diagram form.

A functional block diagram for one embodiment of the imaging spectrometer in a pushbroom space-borne system is shown in FIG. 15. Four major subsystems, indicated by the dotted lines, are included: the fore-optics, 80, the focal plane array, 86, the "frame grabber", 92, and the electronics and data processing, 100. Data storage and telemetry is provided, in this case, by the host platform, via interface 108 or the satellite. This is considered in greater detail.

The ground area to be imaged is viewed by the optical system, 82, which may be a telescope. A mechanical shutter or electronic gating, 84, is used as described earlier in discussing FIG. 4. The spectrum resolving sensor, 88, is a monolithic area array of the design earlier described in detail, which contains the readout shift registers and a preamplifier, 90, on-chip. A microprocessor, 104, controls the image acquisition timing and data processing. The parallel and serial clock, 102, inputs to the sensor are provided via a sensor interface, 94, which also transfers back the video signal from the sensor. The image data are digitized, 96, and stored in an image buffer, 98.

A "frame grabber" is a collective name for the electronics for interfacing and capturing a full set of output signals of a line or area array. These devices usually interface with a computer or may come in a stand-alone configuration, but may use the computer for further data processing and display. Frame grabbers for microcomputer applications are commercially available from many manufacturers, e.g., Data Translation of Marlboro, Mass., DataCube, Epix, and others, and are commonly in use for scientific imaging, LANDSAT image analysis, medical imaging and many other applications. Because of their wide use details of their operation are well known and are not discussed further.

The raw signal is then processed to: a) subtract the dark current signal which is obtained from a previously collected calibration data and stored in RAM, b) correct for pixel non-uniformities, and c) correct for pixel spectral sensitivity. The correction vector to be applied to the image is stored in a look up table, LUT, in RAM, 110. Finally, the desired spectral resolution is selected and the analysis is performed by the subtraction of sequential pixel signal as explained in more detail below. A different spectral resolution may be selected at various portion of the spectrum simply by controlling the data processing. This technique will become clear from reading the quantitative performance analysis which follows in this specification. Further, if the scene of interest includes a moving target, background frame subtraction is used to accentuate the moving target image in the various spectral bands. All these operations are efficiently performed by a dedicated digital signal processor, DSP, 106.

The image data vector, or matrix, $\bar{X}_i$, is operated upon by the dark current and pixel non-uniformity correction vectors, $\bar{D}$, and the spectral sensitivity vector, $\bar{R}_\lambda$, as follows: $\bar{X}_f = \}\bar{X}_i + \bar{D}\}\cdot\bar{R}_\lambda$ to yield the corrected data. These data are then reduced to obtain the desired spectral resolution. The spectral intensity, $I_{i,\lambda}$ of pixel i is obtained by, $I_{i,\lambda} = [X_f]_i - [X_f]_{i-1}$.

Figure 15B:
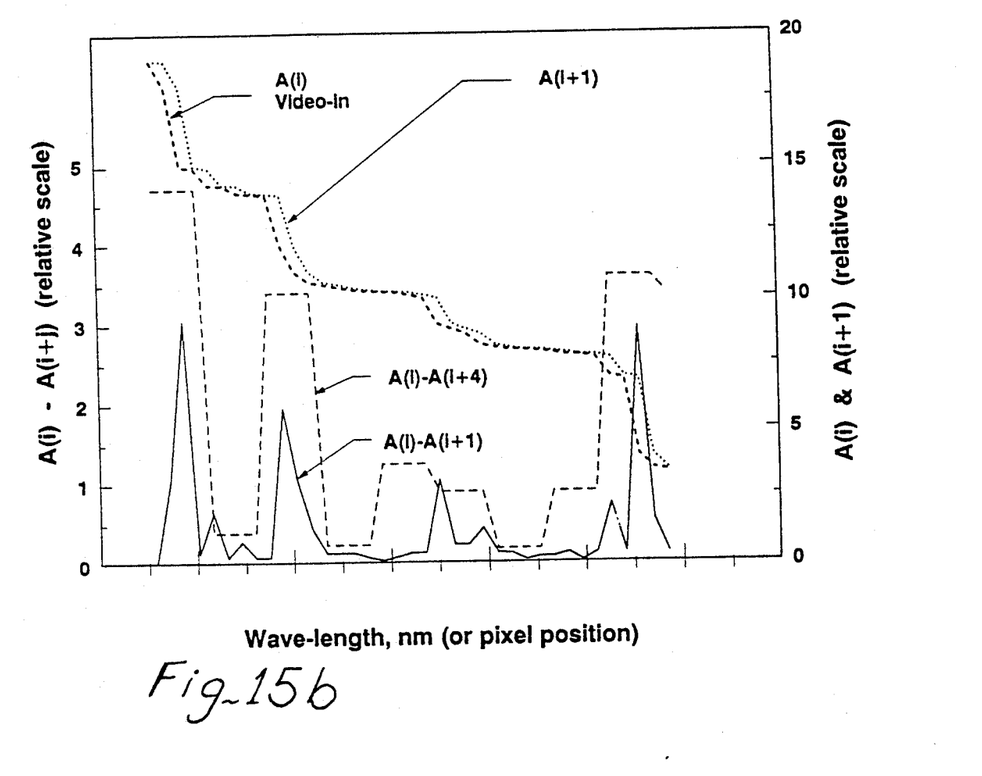
FIG. 15B is a graphic illustration of various spectral resolutions as may be selected in operation of the invention.

The procedure is shown in FIG. 15b. The data vector obtained from the spectrum resolving sensor 88 is marked as line A(i). A copy of the data vector is made in memory, and then it is shifted by one memory register as marked by line A(i+1). Now the two vectors may be subtracted, pixel for pixel, in their corresponding registers. The resulting vector, marked A(i)−A(i+i), is the spectrum of the signal with the highest resolution possible for the specific sensor configuration (explained in the quantitative analysis which follows).

If a lower spectral resolution is acceptable, the copy vector A(i) may be shifted by more than one register. Vector A(i+4) is a copy of A(i) shifted by 4 registers. When the A(i)−A(i+4) operation is performed a vector with a lower spectral resolution is obtained as can be seen in the figure (the resolution of the fine structure is lost). This operation requires the calculation of only one-fourth of the points than the former. Thus, the trade off is of speed versus resolution (as the sampling frequency is reduced, though, aliasing error may increase). The resolution may be selected by software control and may be different at different portion of the spectrum.

Any of the above operations may be performed in conjunction with other common data processing routines. The data processing may be performed on-board the spacecraft, or at the receiving ground station if the raw data are transmitted to the ground first. Further, as it may be clear to those experienced in the art, this embodiment may be used for imaging as well as non-imaging applications, and for laboratory apparatus as well as for space-borne systems.

In the discussion of FIG. 13 a mobile spectrometer was used with a stationary scene. If no relative motion exists between the scene and the sensor then a scanner is used to sequentially project different portions of the scene onto the array. Each portion is projected after the previous frame has been read. Scanner systems are in common use in robotic vision systems, and in supermarket checkout systems, and are well known to those skilled in the art.

Figure 16:
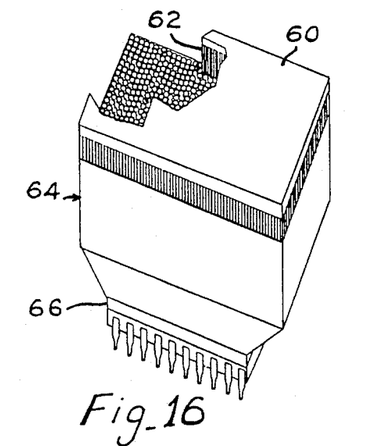
FIG. 16 is an illustration of a modification to the sensor of FIG. 1 to incorporate therewith an image intensifier.

The invention may be improved for situations involving low light levels. A sensor array operating in conjunction with an image intensifier is shown in FIG. 16. The LVF, 60, is placed on top of a common image intensifier, of the type produced by several manufacturers, e.g., ITT and Litton Industries. The LVF allows photons of only selected frequency, or wavelength, to pass through onto the intensifier. The microchannel plate, MCP, 62, in this embodiment, includes the front photocathode and the rear phosphor surface, produces an electron multiplication effect, producing light output at the rear phosphor coated output window. The backplate, 64, which could be a quartz window or a coherent fiber optic bundle, transmits the enhanced optical image to the array, 66. Because of the initial filtering of the radiation by the LVF, the image at every point on the array corresponds to the spectrum of the incoming radiation.

Figure 17:
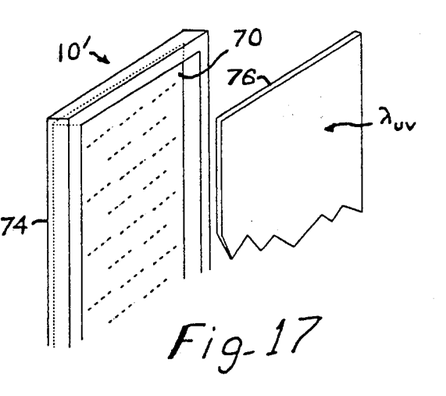
FIG. 17 is a partial illustration in an enlarged view of a structural modification of the sensor array of FIG. 1 permitting the sensor to function as a backlighted thinned array.

In another embodiment, the spectrum resolving sensor may be modified to incorporate a "thinned" CCD array. A thinned Si array is used for enhancement of the ultra violet, UV, response of the array. Typically the front surface of a CCD array is covered to a large extent by thin metal deposits which serve as the electrical gates. Although the longer wavelength of the spectrum go through, the UV radiation is blocked by these gates resulting in a reduced sensitivity of the array. By etching the backside of the Si to a thickness of less than 1 mm, the UV radiation may penetrate through the thin wall from that direction and effect charge accumulation. This arrangement is shown in FIG. 17. The back of the array 10' is etched, 70, and is exposed to the UV radiation rather than the front, 74, on which the gates are deposited. The LVF, 76, in this embodiment, is placed over the etched area of the array.

Figure 18:
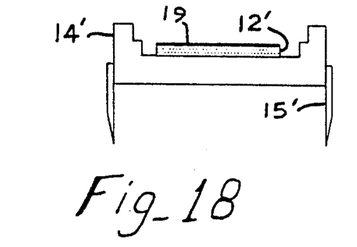
FIG. 18 is a partial side section view of an alternative construction of the sensor array of FIG. 1 in which the linear variable filter is formed directly onto the photosensors in the line or area array.

An alternative construction for the sensor array illustrated in FIGS. 1a-1c in side section view is shown in FIG. 18. For convenience the elements are identified by the same numbers as were used to identify like elements of the prior construction and are primed. This includes the package 14' containing connector pins 15' and the photodetector array 12', which is either a line array or an area array as earlier described in connection with the preceding embodiment, attached by an appropriate adhesive to the bottom of the u-shaped channel in package 14'. However, the linear variable filter 19 is coated directly over the top of the array, which serves as a substrate. There is no spacing or gap between the filter and the array. The coating covers all interstitial spaces between pixels in the array as well. Inasmuch as the quartz glass in the filter of the preceding embodiment serves as a physical support for the optical coatings, the elimination of that glass does not materially detract from the optical filtering achieved. However, in this instance the entire photodetector array must be included in the optical filter coating process.

Figure 19:
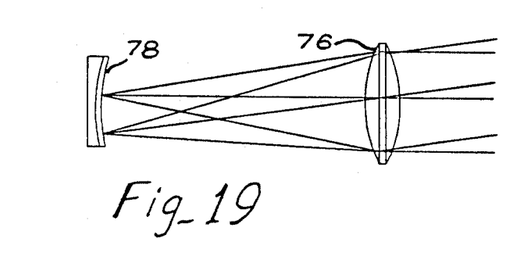
FIG. 19 is a partial illustration of still an additional modification to the sensor array of FIG. 1, in which the surface of the array is of a curved geometry for use in large focal planes.

A large focal plane is often required to increase the spatial resolution of an image, as partially illustrated in FIG. 19. Due to geometrical optics, the focal zone of the optical system, 76, is slightly curved. If a plane array is used in such a case, some of the image is out of focus. The sensor in this embodiment, 78, is slightly curved to improve the spectrum resolving focusing and resolution of the image.

The quantitative performance of the sensor is analyzed as follows: The $n_{th}$ and the $(n+1)_{th}$ pixels of a sensor assembly constructed with a long-wave pass LVF, receive radiation at a wavelength above $$\lambda_n = \frac{(\lambda_2 - \lambda_1)}{N} \cdot n + \lambda_1 \quad (1)$$

$$\lambda_{n+1} = \frac{(\lambda_2 - \lambda_1)}{N} \cdot (n + 1) + \lambda_1 \quad (2)$$

Here, $\lambda_1$ and $\lambda_2$ are the lower and upper wavelength ranges of the LVF and N is the total number of pixels covered along the axial direction by the LVF between these wavelengths.

By subtracting the signals of these two pixels, the radiation intensity above $\lambda_n$ but below $\lambda_{n+1}$ is obtained. This becomes then the spectral band-pass, or the resolution of the spectrum resolving sensor.

$$\text{Spectral band pass} = \Delta\lambda_p = \lambda_{n-1} - \lambda_n = \frac{\lambda_2 - \lambda_1}{N} \quad (3)$$

By subtracting the signal of consecutive pixels, the complete spectrum with the above band-pass is obtained. The systems resolving power is defined as, $$R = \frac{\lambda_2 - \lambda_1}{\Delta\lambda_p} = N \quad (4)$$

Further, in cases the spectrum does not change abruptly it is possible to improve on the resolution by factoring out the "dead space" between the pixels. In that case the spectral band pass and resolving power of a pixel becomes, $$\Delta\lambda_p = \left(\frac{\lambda_2 - \lambda_1}{N}\right)\frac{X_p}{X_{c-c}} \quad (5)$$

and $$R = \frac{X_{c-c}}{X_p} N \quad (6)$$

Where, $X_{c-c}$ is the center-to-center distance of the pixels in the array, and $X_p$ is the width of a single pixel as shown in FIG. 2b.

If a wider band-pass is desired then the subtraction may be done over several pixels rather than consecutive ones. Therefore, the band pass that may be measured is:

$$\Delta\lambda_p = \frac{\lambda_2 - \lambda_1}{N} i \quad (7)$$

Where i=1, 2, 3 ... is an integer. The control of the band-pass is done in the signal processing computer only; no changes are required in the sensor's hardware. Hence, band-pass may be changed at any time during a scan process.

For a 1024 pixel array, with a 25 micrometer center-to-center and 15 micrometer wide pixels, operating with an edge-type LVF over the visible spectrum from 400 to 700 nm, the spectral band-pass is 0.176 nm (1.76 Angstrom) or selectively 0.293i nm (2.93i Angstrom) where i=1, 2, 3 ... the resolving power of the system is at best 1707.

The spectral resolution of the invention using a bandpass LVF is shown as an example of performance analysis for other sensor designs. The resolving power of a common optical filter at a wavelength $\lambda$ and band-pass $\Delta\lambda_f$ is customarily defined as $$R_f = \frac{\lambda}{\Delta\lambda_f} \quad (8)$$

The resolving power of a linear variable filter with a lower and upper wavelength transmission of $\lambda_1$ and $\lambda_2$ will be defined in a slightly different way as:

$$R_f = \frac{\lambda_2 - \lambda_1}{\Delta\lambda_f} \quad (9)$$

In this form the resolution of a LVF is the same at all wavelengths. From FIG. 10, the band-pass of a single pixel in a CCD array which is covered with the above LVF is $$\Delta\lambda_p = \frac{\lambda_2 - \lambda_1}{X_{c-c} N} X_p + \Delta\lambda_f \quad (10)$$

where, as before, $X_{c-c}$ is the center-to-center distance of the pixels in the array, $X_p$ is the width of a single pixel, and N is the number of pixels in the array. The first term on the right hand side reflects the finite length of the pixel which spreads the band-pass. An ideal, square-wave, response of the pixels in the array and ideal, square-wave, filter band-pass were assumed.

The system's resolving power may be defined as $$R_{sys} = \frac{\lambda_2 - \lambda_1}{\Delta\lambda_p} \quad (11)$$

The performance of each pixel, or of the invention, may be compared with that of the LVF alone as follows:

$$\frac{R_{sys}}{R_f} = \frac{1}{1 + \frac{R_f}{R_p}} \quad (12)$$

where the resolving power of a single pixel is defined, as before, in terms of its relative size in the array, as $$R_p = \frac{X_{c-c}}{X_p} N \quad (13)$$

The overall system performance for a 1024 pixel array, with a 25 micron center-to-center and 15 micron wide pixels, operating with a LVF over the complete visible spectrum from 400 to 700 nm at a 5 nm band-pass is $R_p=1707$, $R_f=60$, and $R_{sys}/R_f=0.966$, which means that the system resolving power is degraded by about 3.4% as compared to the resolving power of the filter alone. As in the previous embodiment, a much higher resolution may be obtained by subtracting the signals of adjacent pixels.

As evident from the foregoing discussion, in non-imaging applications, the invention may be used for the measurements of spectral transmission through samples such as in medical, pathological, biological, geological, or chemical laboratory work; for molecular absorption and emission spectra; for spectral reflectance measurements in similar fields; for pollution and emission control by measuring the transmission or the absorption of radiation through a stack or exhaust plume; for remote sensing of air pollution, of ozone in the atmosphere, using a variety of ground, air-borne, or space-borne instruments; for astronomical spectral analyses of stellar radiation; for pyrometry by measuring the thermal radiation emitted by heated bodies at several wavelengths; underwater spectrometry; and other usages in which spectrometers, spectro-photometers, or spectrographs are currently utilized.

In imaging applications the invention may be used for color copying machines; for color printing; for color facsimile machines; color picture-phone; color page scanning; robotic vision; aerial mapping; air-borne and space-borne resources monitoring; reconnaissance and surveillance; sorting of parts, mail, currency, food; non-contact inspection; missile guidance; star tracking; and other applications requiring color resolution using either line or area image devices.

I believe that the foregoing description of the preferred embodiments of my invention is sufficient in detail to enable one skilled in the art to make and use the invention. However, it is expressly understood that the details of the elements which I have presented for the foregoing purpose is not intended to limit the scope of my invention, in as much as equivalents to those elements and other modifications thereof, all of which come within the scope of my invention, will become apparent to those skilled in the art upon reading this specification. Thus my invention is to be broadly construed within the full scope of the appended claims.

What I claim is:

1. In a spectrometer apparatus for receiving and analyzing polychromatic light, the combination comprising:

a continuous variable wavelength optical filter means of a predetermined length, said optical filter means for receiving said polychromatic light simultaneously over and along a first side thereof and for transmitting out and along a second side thereof, opposed to said first side, spectral filtered portions of received polychromatic light; said spectral portions being variable in spectral range in dependence upon position along the length of said optical filter means, whereby the particular spectral range of light transmitted through said second side of said optical filter means at selected positions along the length thereof is dependent upon relative position along said length of said optical filter means;

a monolithic substrate, including a plurality of photosensitive elements formed thereon; said photosensitive elements being arranged in at least one row to form an array; each of said photosensitive elements for providing an output representative of intensity of light incident thereon;

said optical filter means being located in overlying relationship with said array with said second side of said optical filter means facing said array, whereby different spectral ranges of light are incident upon different photosensitive elements of said array with said array producing an output representative of the light level of different ranges of light spectrum passed by said optical filter means at different positions along the length of said optical filter means;

electronic means for reading the output of said array to provide an output representative of the spectral characteristics of said received polychromatic light; and support means for supporting at least said optical filter means and said substrate means in a unitary assembly; and wherein said monolithic substrate is of a slightly curved geometry and said optical filter means is of a slightly curved geometry with the curve of the one being substantially the same as the curve of the other to define a curved focal plane.

2. In a spectrometer apparatus for receiving and analyzing polychromatic light, the combination comprising:

a continuous variable wavelength optical filter means of a predetermined length, said optical filter means for receiving said polychromatic light simultaneously over and along a first side thereof and for transmitting out and along a second side thereof, opposed to said first side, spectral filtered portions of received polychromatic light; said spectral portions being variable in spectral range in dependence upon position along the length of said optical filter means, whereby the particular spectral range of light transmitted through said second side of said optical filter means at selected positions along the length thereof is dependent upon relative position along said length of said optical filter means;

a monolithic substrate, including a plurality of photosensitive elements formed thereon; said photosensitive elements being arranged in at least one row to form an array; each of said photosensitive elements for providing an output representative of intensity of light incident thereon;

said optical filter means being located in overlying relationship with said array with said second side of said optical filter means facing said array, whereby different spectral ranges of light are incident upon different photosensitive elements of said array with said array producing an output representative of the light level of different ranges of light spectrum passed by said optical filter means at different positions along the length of said optical filter means;

electronic means for reading the output of said array to provide an output representative of the spectral characteristics of said received polychromatic light;

support means for supporting at least said optical filter means and said substrate means in a unitary assembly; and image intensifier means;

said image intensifier means being located between said optical filter means and said array.

3. In a spectrometer apparatus for receiving and analyzing polychromatic light, the combination comprising:

a continuous variable wavelength optical filter means of a predetermined length, said optical filter means for receiving said polychromatic light simultaneously over and along a first side thereof and for transmitting out and along a second side thereof, opposed to said first side, spectral filtered portions of received polychromatic light; said spectral portions being variable in spectral range in dependence upon position along the length of said optical filter means, whereby the particular spectral range of light transmitted through said second side of said optical filter means at selected positions along the length thereof is dependent upon relative position along said length of said optical filter means;

a monolithic substrate, including a plurality of photosensitive elements formed thereon; said photosensitive elements being arranged in at least one row to form an array; each of said photosensitive elements for providing an output representative of intensity of light incident thereon;

said optical filter means being located in overlying relationship with said array with said second side of said optical filter means facing said array, whereby different spectral ranges of light are incident upon different photosensitive elements of said array with said array producing an output representative of the light level of different ranges of light spectrum passed by said optical filter means at different positions along the length of said optical filter means;

electronic means for reading the output of said array to provide an output representative of the spectral characteristics of said received polychromatic light; and support means for supporting at least said optical filter means and said substrate means in a unitary assembly;

lens means for receiving said polychromatic light originating on a front side thereof and focusing the light into at least a line on a rear side thereof on said optical filter means;

shutter means for opening and closing a light transmissive path;

said lens means being optically coupled in series with said shutter means; and wherein said lens means comprises an anamorphic lens means.

4. The invention as defined in claim 3, further comprising:

a portable case, said case having an interior and a front opening for permitting polychromatic light external to said case to enter said interior;

said support means being housed within said interior with said first side of said optical filter means being spaced from and facing said opening to permit external polychromatic light to enter said case and cover the length of said optical filter means; said shutter means being supported in said front opening of said case, whereby polychromatic light is focused through said lens and by operation of said shutter means is admitted into said interior of said case; and said electronic means being housed within said interior.

5. The invention as defined in claim 3 wherein said electronic means is formed within and disposed upon said monolithic substrate.

6. The invention as defined in claim 3 wherein said plurality of photosensitive elements in said array further comprise parallel output type photodetectors.

7. The invention as defined in claim 3 wherein said electronic means includes multiplexer means and circuit board means for supporting said multiplexer means and said monolithic substrate in a hybrid assembly.

8. The invention as defined in claim 3 wherein said photosensitive elements of said array comprise charge storage type semiconductor devices, said devices are selected from the group consisting of:
 (a) charge coupled device;
 (b) charge injection device;
 (c) a charge coupled photodiode array;
 (d) a self scanned photodiode array; and
 (e) a multiplexed photodiode array.

9. The invention as defined in claim 3 wherein said array comprises a plurality of rows to define a two-dimensional array.

10. The invention as defined in claim 3 wherein said optical filter means and said substrate of photosensitive elements are integrally formed in a one piece unitary assembly.

11. The invention as defined in claim 3 wherein said anamorphic lens means comprises a cylindrical lens.

12. The invention as defined in claim 3 wherein said optical filter means comprises and edge type filter.

13. The invention as defined in claim 12 wherein said edge type filter comprises a long-wave pass filter.

14. The invention as defined in claim 3 wherein said optical filter means comprises a band-pass filter.

15. In a spectrometer apparatus for receiving and analyzing polychromatic light, the combination comprising:

a continuous variable wavelength optical filter means of a predetermined length, said optical filter means for receiving said polychromatic light simultaneously over and along a first side thereof and for transmitting out and along a second side thereof, opposed to said first side, spectral filtered portions of received polychromatic light; said spectral portions being variable in spectral range in dependence upon position along the length of said optical filter means, whereby the particular spectral range of light transmitted through said second side of said optical filter means at selected positions along the length thereof is dependent upon relative position along said length of said optical filter means;

a monolithic substrate, including a plurality of photosensitive elements formed thereon; said photosensitive elements being arranged in at least one row to form an array; each of said photosensitive elements for providing an output representative of intensity of light incident thereon;

said optical filter means being located in overlying relationship with said array with said second side of said optical filter means facing said array, whereby different spectral ranges of light are incident upon different photosensitive elements of said array with said array producing an output representative of the light level of different ranges of light spectrum passed by said optical filter means at different positions along the length of said optical filter means;

electronic means for reading the output of said array to provide an output representative of the spectral characteristics of said received polychromatic light; and support means for supporting at least said optical filter means and said substrate means in a unitary assembly;

said electronic means including:

means for subtracting the output of one photosensitive element in said row from the corresponding output of an adjacent element in said row that precedes said one photosensitive element in position in said row to produce a different signal; and means for outputting said difference signal as representative of the spectral characteristic detected by said adjacent element.

16. The invention as defined in claim 15 further comprising: means for selecting said one of the plurality of adjacent elements from which to subtract the output of said one photosensitive lement prior to subtraction by said means for subtracting.

17. The invention as defined in claim 15 further comprising: display means responsive to said electronic means for visually displaying the output of said electronic means to thereby visually depict the spectral characteristics of the incident light as measured by said array and processed by said electronic means.

18. In a spectrometer apparatus for receiving and analyzing polychromatic light, the combination comprising:

a continuous variable wavelength optical filter means of a predetermined length, said optical filter means for receiving said polychromatic light simultaneously over and along a first side thereof and for transmitting out and along a second side thereof, opposed to said first side, spectral filtered portions of received polychromatic light; said spectral portions being variable in spectral range in dependence upon position along the length of said optical filter means, whereby the particular spectral range of light transmitted through said second side of said optical filter means at selected positions along the length thereof is dependent upon relative position along said length of said optical filter means;

a monolithic substrate, including a plurality of photosensitive elements formed thereon; said photosensitive elements being arranged in at least one row to form an array; each of said photosensitive elements for providing an output representative of intensity of light incident thereon;

said optical filter means being located in overlying relationship with said array with said second side of said optical filter means facing said array, whereby different spectral ranges of light are incident upon different photosensitive elements of said array with said array producing an output representative of the light level of different ranges of light spectrum passed by said optical filter means at different positions along the length of said optical filter means;

electronic means for reading the output of said array to provide an output representative of the spectral characteristics of said received polychromatic light; and support means for supporting at least said optical filter means and said substrate means in a unitary assembly and wherein said electronic means comprises:

electronic processor means containing a program; said processor means including:

first means for obtaining output from said array to provide spectral intensity information in analog form for the individual photosensitive elements in said array;

analog to digital converter means for converting output of said first means into digital form to provide spectral intensity information in digital form;

interface means for receiving output from said first means and supplying said output under control of said processor means to said analog to digital converter means;

an image buffer for storing said digital form spectral intensity information received from said analog to digital converter means;

digital signal processor means;

calibration memory means containing calibration data on each photosensitive element in said array for supplying said calibration data to said digital signal processor means under control of said electronic processor means;

said digital signal processor means being responsive to said buffer means and said calibration data for providing corrected digital form spectral information at an output; and display means for receiving said corrected digital form spectral information from said signal processor means and converting said corrected digital form spectral information into a visual display;

said electronic means further comprising:

algorithm means for subtracting the output of any one photosensitive element in said array from the output of any selected adjacent preceding photosensitive element in said array to provide a difference output, said difference output being representative of the spectra detected by said selected adjacent preceeding photosensitive element in said array; wherein said difference outputs for each photosensitive element may be supplied to said buffer means.

19. A sensor for a spectrometer apparatus comprising in combination: a monolithic array of photosensitive elements; continuous variable wavelength optical filter means; said optical filter means being located in overlying relationship with said array; and anamorphic lens means located in overlying relationship with said optical filter means for receiving polychromatic light and focusing said polychromatic light into at least a line upon said optical filter means.

20. A sensor for a spectrometer apparatus comprising in combination: a monolithic array of photosensitive elements; continuous variable wavelength optical filter means; said optical filter means being located in overlying relationship with said array; and with said optical filter means comprising an edge type filter; and further comprising: electronic means for polling said array to determine the output of each photosensitive element of said array, said electronic means including means for subtracting the output of any one photosensitive element in a row of said array from any immediately preceding photosensitive element within said row of said array to produce a difference output representative of the spectral range between said adjacent photosensitive elements to thereby provide enhanced spectral resolution.

21. The invention as defined in claim 20, wherein said edge type filter comprises a long-wave pass filter.

22. The invention as defined in claim 20 wherein said edge type filter comprises a short-wave pass type filter.

23. A sensor for a spectrometer apparatus comprising in combination: a monolithic array of photosensitive elements and continuous variable wavelength optical filter means; said optical filter means being located in overlying relationship with said array; and wherein said optical filter means comprises a band-pass type filter and, further comprising: electronic means for polling said array to determine the output of each photosensitive element of said array, said electronic means including means for subtracting the output of any one photosensitive element in a row of said array from any immediately preceding photosensitive element within said row of said array to produce a different output representative of the spectral range between said adjacent photosensitive devices to thereby provide enhanced spectral resolution.

* * * * *